(12) United States Patent
Dreby et al.

(10) Patent No.: US 10,960,449 B2
(45) Date of Patent: Mar. 30, 2021

(54) EXHAUST SYSTEM REPAIR APPARATUS AND REPAIR METHOD

(71) Applicants: James Dreby, Brandon, FL (US); Daniel Dreby, Brandon, FL (US)

(72) Inventors: James Dreby, Brandon, FL (US); Daniel Dreby, Brandon, FL (US)

(*) Notice: Subject to any disclaimer, the term of this patent is extended or adjusted under 35 U.S.C. 154(b) by 203 days.

(21) Appl. No.: 16/389,486

(22) Filed: Apr. 19, 2019

(65) Prior Publication Data

US 2020/0331048 A1 Oct. 22, 2020

(51) Int. Cl.
| | |
|---|---|
| *B21D 3/16* | (2006.01) |
| *F16L 55/18* | (2006.01) |
| *B21D 3/10* | (2006.01) |
| *B21D 7/06* | (2006.01) |
| *F01N 13/08* | (2010.01) |

(52) U.S. Cl.
CPC .............. *B21D 3/16* (2013.01); *B21D 3/10* (2013.01); *B21D 7/06* (2013.01); *F01N 13/08* (2013.01); *F16L 55/18* (2013.01); *F01N 2450/08* (2013.01)

(58) Field of Classification Search
CPC ... B21D 3/00; B21D 3/10; B21D 3/14; B21D 3/16; B21D 7/06; F16L 55/18; F01N 2450/08; Y10T 403/4608; Y10T 403/4621
USPC ........... 72/31.06, 367.1, 370.23, 370.24, 705
See application file for complete search history.

(56) References Cited

U.S. PATENT DOCUMENTS

| | | | | |
|---|---|---|---|---|
| 3,324,701 | A * | 6/1967 | Shultz ................... | B21O 37/30 72/393 |
| 6,234,000 | B1 * | 5/2001 | Bowling ................. | B21D 3/16 29/402.19 |
| 2016/0245320 | A1 * | 8/2016 | Oetlinger ............... | E05D 5/0238 |
| 2019/0240712 | A1 * | 8/2019 | Semeraro ................ | F16L 55/18 |
| 2020/0147663 | A1 * | 5/2020 | Xue ........................ | B21D 53/30 |

FOREIGN PATENT DOCUMENTS

| | | | |
|---|---|---|---|
| CN | 104624736 A | * | 5/2015 |
| CN | 106077160 A | * | 11/2016 |
| CN | 108080445 A | * | 5/2018 |

* cited by examiner

*Primary Examiner* — Shelley M Self
*Assistant Examiner* — Katie L. Parr
(74) *Attorney, Agent, or Firm* — Justin Luby

(57) ABSTRACT

The present disclosure pertains to a tool and repair method that facilitates restoring an exhaust pipe that has been become deformed as the result of a rear end collision which both restores to the pipes original shape and re-aligns the pipes to their original configuration, so the exhaust pipes can be re-attached to the pipe hanger without the need to replace the exhaust system pipes. The tool is comprised of a hydraulic piston cylinder, a stationary rectangular steel head attached to the body of the hydraulic piston, and a movable flat plate, located inside of the rectangular steel head and connected to the piston shaft of the hydraulic piston cylinder. To use the tool the deformed section of pipe is placed within the head of steel head of the compressive pipe repair apparatus when the cylinder piston shaft and movable flat plate are retracted. The hydraulic piston cylinder is activated by the mechanic and the cylinder piston shaft and movable flat plate will extend upward and contact the bottom of the deformed section is exhaust pipe, exerting compressive stresses against the exhaust pipe until the pipe has been reformed to match the original shape.

1 Claim, 9 Drawing Sheets

EXHAUST SYSTEM REPAIR APPARATUS AND REPAIR METHOD

CROSS-REFERENCE TO RELATED APPLICATIONS

N/A

FIELD OF THE INVENTION

The present invention relates generally to an apparatus and repair method for restoring an automobile exhaust system pipe that was deformed in an automobile accident.

BACKGROUND

An automobile's exhaust system transports the gases created from the engine when the fuel and air are burned in the combustion chamber to the rear of the vehicle, where the gases are exhausted. The major components of the exhaust system are the exhaust manifold(s), exhaust pipes, catalytic converter(s), muffler, tailpipe, and pipe hangers. The exhaust pipes convey the exhaust to the rear of the vehicle. The catalytic converter converts harmful pollutants into less harmful emissions before they ever leave the car's exhaust system. The muffler reduces engine exhaust noise, and the tail pipe is a final section of exhaust pipe which opens to the atmosphere. The pipe hangers support the exhaust pipes from the underbody of the car, with enough strength to keep them in place but also enough flexibility to withstand movement caused by driving.

When designing an automobile exhaust system the exhaust pipes are often bent to wrap around or otherwise accommodate other nearby components of the car, such as the axles. The exhaust pipes are circular, and when the car is built, special pipe bending machines, which support the pipe during the bending process, are used to maintain the round shape of the pipe throughout the pipe bends. The pipes are fabricated on the machines, and then mounted onto the vehicle.

Failure to maintain the circular profile shape of the exhaust pipes in the bends results in a flawed elliptical profile shape known as ovality, which will restrict exhaust flow through the pipes, negatively affecting engine performance. The deformed pipe will have an axis that is longer than the original Nominal Outer Diameter (OD) of the pipe, known as the Max OD and an axis that is shorter than the Nominal OD of the pipe, known as the Min OD.

When an automobile experiences a rear end collision, it is common that the tailpipe will be contacted by the bumper of the car colliding into it, exerting forces on the exhaust system. These forces will typically cause the exhaust pipes to bend and deform, most typically at the location of an existing bend, where the pipe is the weakest. Because the bending of the pipe is not properly supported during an automobile rear end collision, as it is during the fabrication of the pipe, the resulting pipe bend will have ovality. Additionally, when the pipe is bent, the collision will also break a number of the pipe hangers which supports the exhaust system.

Once exhaust pipes have become deformed as the result of a rear end collision, it is imperative the pipes be restored to their original configuration and circular profile shape. As noted above, an out of round pipe will restrict exhaust flow through the pipes, negatively affecting engine performance. Additionally, exhaust pipes not supported by pipe hangers will be subjected to stresses from vibration and shock from the automobile, which will likely further deform the exhaust pipe, or cause the pipe to break from the exhaust system, likely where the pipe connects to one of the other exhaust system components, such as the muffler. A break in the exhaust system could allow poisonous exhaust fumes to enter the inside of the passenger component of the automobile.

Currently, there are two methods commonly utilized to repair exhaust pipes that have been deformed as the result of a rear end collision. One method is to replace the exhaust system with new components, either completely, or partially. Replacing the exhaust components is not labor intensive, but is an expensive repair method because the cost of the replacement parts can be several thousand dollars.

A second method commonly utilized to repair exhaust pipes that have become deformed as the result of a rear end collision is to cut the damaged section of pipe from the exhaust system, use a pipe bending machine to re-form the pipe back to its original configuration, and then weld the repaired section of pipe back into the exhaust system. While a cost effective from the aspect of not having to purchase new components, this repair method is still costly due to the significant labor hours required to complete a repair using this method. Additionally, not all repair shops have the appropriate pipe bending machine available to utilize this method or repair.

While both of these methods of repairs are effective to remediate repair exhaust pipes that have become deformed as the result of a rear end collision, both methods will likely result in a repair bill of several thousand dollars to be borne by the automobile owner or the insurance company.

There have been a number of innovative approaches and inventions introduced to the market in previous years addressing methods to repair bent tubing and pipes. The "Ball-bat repairing method" outlined in U.S. Pat. No. 6,234,000 describes a ball-bat repairing apparatus to repair softball and baseball bats, in which particularly aluminum ball-bats which have been deformed from repeated use are returned to substantially their original diameter along the longitudinal extent of the ball-bat barrel. The ball-bat repairing apparatus has a frame which holds a two-piece die therein. The two-piece die has a top half and a bottom half in which a pair of semi-cylindrical die inserts are secured. A compression member is threadedly received through the frame and is located in mechanical cooperation with a first of the die halves. When a ball-bat is placed within the die so that the damaged portion of the barrel is positioned between the die insert halves, a user compresses the deformed portion of the ball-bat between the first and second die inserts to substantially return the ball-bat barrel to its original diameter. While the device may be effective for repairing a bent exhaust system, as well as a baseball bat, the apparatus would still require the mechanic to cut the damaged section of pipe from the exhaust system, use the ball-bat repairing apparatus to re-form the pipe back to its original configuration, and then weld the repaired section of pipe back into the exhaust system.

The "Hydraulic powered pipe and tubing straightener" outlined in U.S. Pat. No. 4,475,373 depicts a somewhat different approach wherein a pipe straightening tool that includes an operating unit that can be inserted forwardly in a pipe. A hydraulic cylinder unit is disposed between and connected to the actuator and another toggle linkage connecting the lower and nose segments so that extension of hydraulic cylinder unit concurrently urges upward movement of both the upper segment and the nose segment which will push on the inner wall of the deformed section of pipe, restoring the pipe to its original circular profile shape. While this apparatus would be effective for restoring deformed straight pipes to their original circular profile shape, the unit is long and is fitted to the inner diameter of the pipe the tool is inserted into, the apparatus would not be effective to travel though the designed bends in an automobile exhaust system. Additionally, while the device could restore the deformed straight pipes to their original circular profile shape, the apparatus would not re-align the pipes to their original alignment with the pipe hanger, which would then require an additional step, and time to complete.

The "Vibrating pipe straightener" outlined in U.S. Pat. No. 5,485,739 depicts another novel approach to restoring deformed straight pipes to their original circular profile shape wherein a straightener for removing dents from an installed section of pipe. The inventive device includes a tapered body position-able within the pipe and attached to a cable. A vibrating assembly within the body removes dents from the pipe as the device is pulled therethrough the pipe by the cable. While this apparatus would be effective for restoring deformed straight pipes to their original circular profile shape, the use of the apparatus requires access to both ends of the pipe, therefore to use the apparatus to repair an exhaust system, a portion of the exhaust pipe upstream of the damaged area would need to be cut to insert the apparatus into the exhaust pipe, and then welded beck into place once the repairs are complete. The resulting repair would still be quite time consuming and costly to complete. Additionally, while the device could restore the deformed straight pipes to their original circular profile shape, the apparatus would not re-align the pipes to their original alignment with the pipe hanger, which would then require an additional step, and time to complete.

Therefore, a need exists for a novel tool and repair method that facilitates restoring an exhaust pipe that has been become deformed as the result of a rear end collision which both restores to the pipes original shape and re-aligns the pipes to their original configuration, so the exhaust pipes can be re-attached to the pipe hanger without the need to replace the exhaust system pipes. Additionally this novel tool and repair method should be able to complete the aforementioned repair with the exhaust system remaining on the automobile during the repairs, thereby reducing labor costs to complete the repair as well.

SUMMARY

To accomplish this object, a compressive pipe repair apparatus is provided which is comprised of a hydraulic piston cylinder, a stationary rectangular steel head attached to the body of the hydraulic piston, and a movable flat plate, located inside of the rectangular steel head and connected to the piston shaft of the hydraulic piston cylinder.

The repair method of the involves placing the deformed section of pipe within the head of steel head of the compressive pipe repair apparatus when the cylinder piston shaft and movable flat plate are retracted. The compressive pipe repair apparatus is oriented with the deformed section of pipe so that the Max OD axis of the deformed section of pipe will contact the center-top of the rectangular steel head and the center of the movable flat plate.

Once the deformed section of pipe is oriented within the head of steel head of the compressive pipe repair apparatus, the hydraulic piston cylinder is activated by the mechanic and the cylinder piston shaft and movable flat plate will extend upward and contact the bottom of the Max OD axis of the deformed section is exhaust pipe. The hydraulic piston cylinder will continue to extend exerting compressive stresses against the exhaust pipe. The mechanic will continue to operate the hydraulic piston cylinder until the Max OD axis of the pipe has been reformed to match the original Nominal OD of the pipe. By compressing the Max OD axis of the exhaust pipe to match the Nominal OD, the Min OD of the pipe will also extend to match the Nominal OD of the pipe as well, restoring the exhaust pipe to its original circular profile shape prior to the collision.

This repair method has a considerable unanticipated benefit as well. By restoring the exhaust pipe to its original circular profile shape, the bent exhaust pipe will also naturally relocate itself to its original alignment with the broken pipe hanger(s), making re-assembly of the exhaust system simple.

The use of the afore described compressive pipe repair apparatus and repair method will significantly reduce the cost of repairs in restoring an exhaust pipe that has been become deformed as the result of a rear end collision. This repair method achieves this result, as the replacement of damaged parts is not required. Additionally, the time required for the mechanic to complete the repair is significantly reduced, as the repair can be completed without removing the exhaust system from the automobile.

DETAILED DESCRIPTION OF THE INVENTION AND PREFERRED EMBODIMENT

Figure 1:
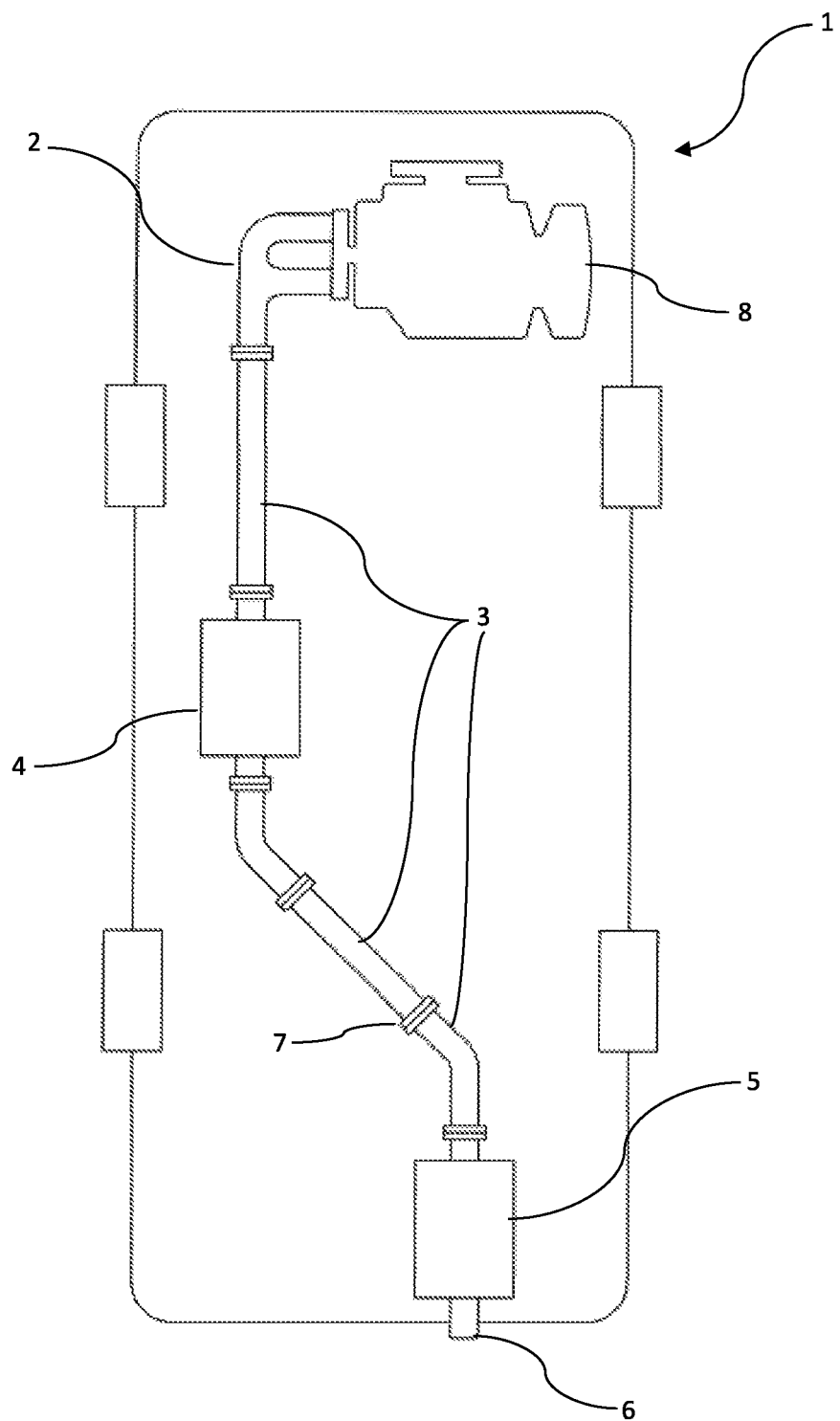
FIG. 1 is a diagram depicting a typical automobile exhaust system.
Figure 2:
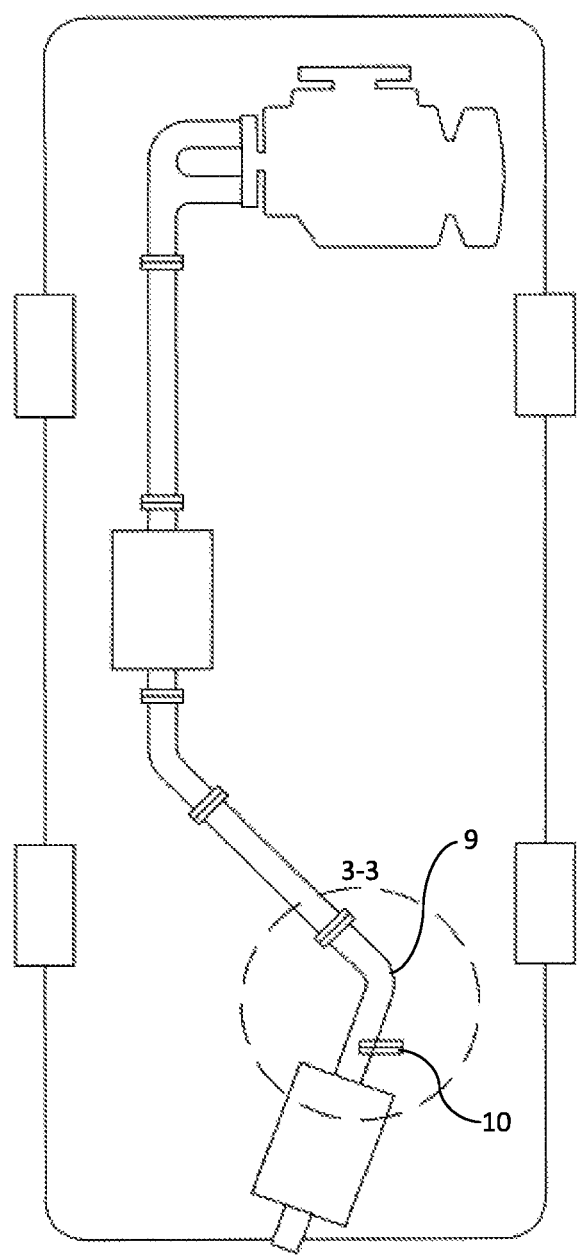
FIG. 2 is a diagram depicting an automobile exhaust system which has been damaged in a rear end collision.

As depicted in FIGS. 1 & 2, the primary components of the exhaust system of an automobile 1 are the exhaust manifold 2, exhaust pipes 3, catalytic converter 4, muffler 5, tailpipe 6, and pipe hangers 7. The exhaust manifold 2 collects the exhaust gases from multiple cylinders of the engine 8 into one pipe. The exhaust pipes 3 convey the exhaust to the rear of the vehicle, away from the passenger section of the vehicle. The catalytic converter 4 converts harmful pollutants into less harmful emissions before they ever leave the car's exhaust system. The muffler 5 reduces engine exhaust noise, and the tail pipe 6 is a final section of exhaust pipe which opens to the atmosphere. The pipe hangers 7 support the exhaust pipes from the underbody of the automobile 1, with enough strength to keep them in place but also enough flexibility to withstand movement caused by driving.

Figure 3:
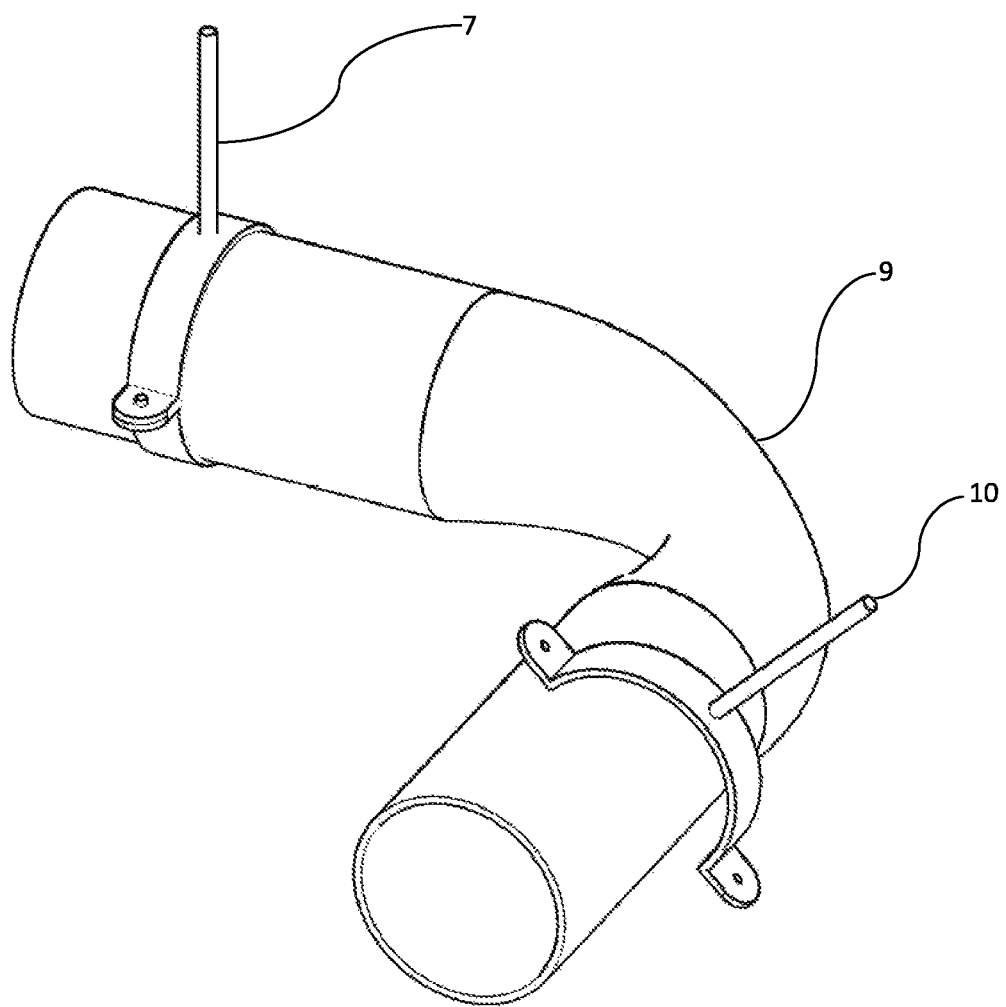
FIG. 3 is an enlarged view of a deformed exhaust pipe taken from 3-3 of FIG. 3.

As depicted in FIG. 2, when an automobile 1 experiences a rear end collision, it is common that the tailpipe 6 will be contacted by the bumper of the car colliding into it, exerting forces on the exhaust system. These forces will typically cause the exhaust pipes 3 to bend and deform, most typically at the location of an existing bend, where the exhaust pipe 3 is the weakest. As depicted in FIG. 3, because the deformed section 9 of the exhaust pipe is not properly supported during an automobile rear end collision, the resulting pipe bend will have ovality. Additionally, when the exhaust pipe is deformed, the collision will also break a number of the pipe hangers 10 which support the exhaust system.

Figure 4:
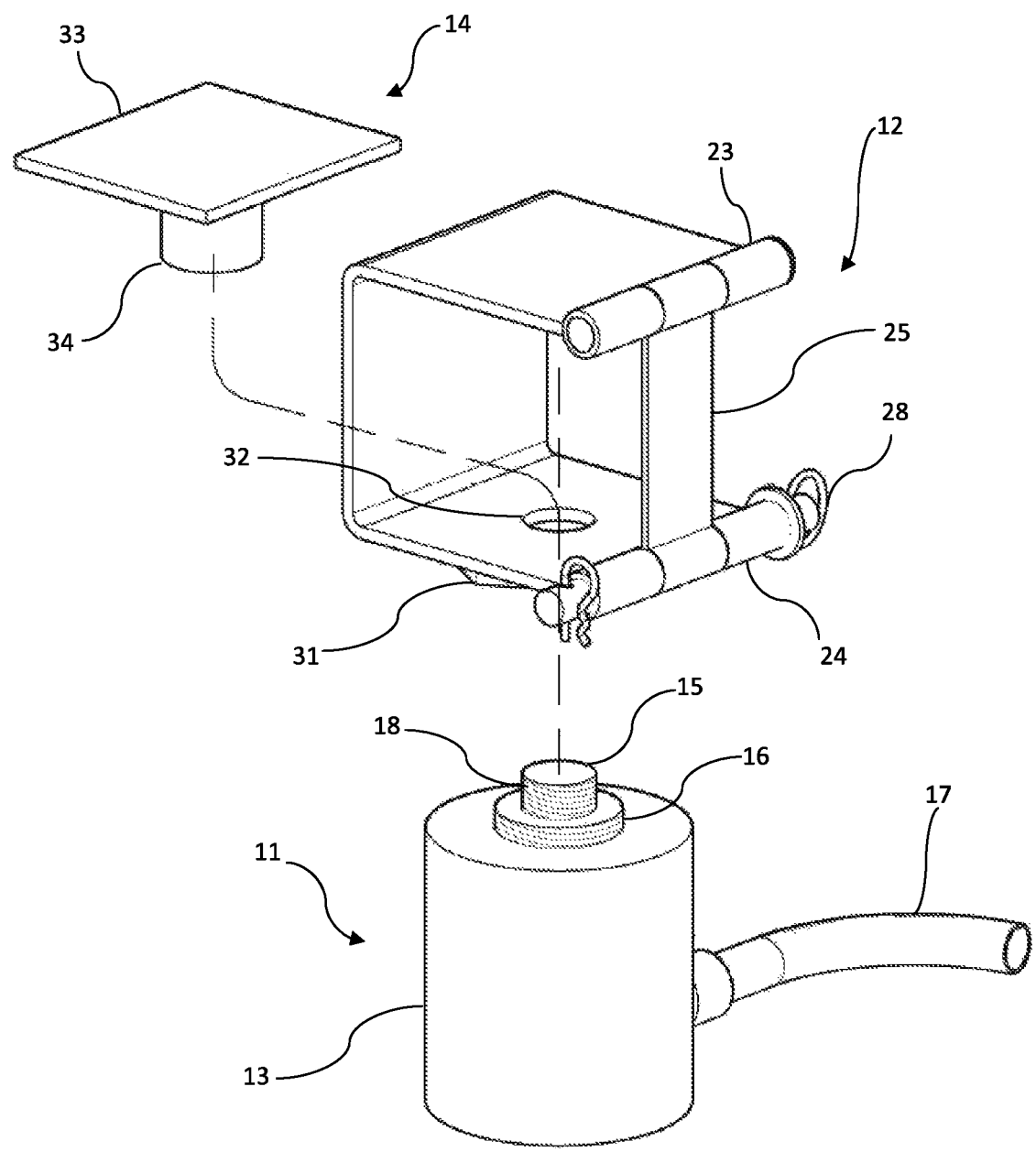
FIG. 4 is an exploded perspective view of the compressive pipe repair apparatus.
Figure 5:
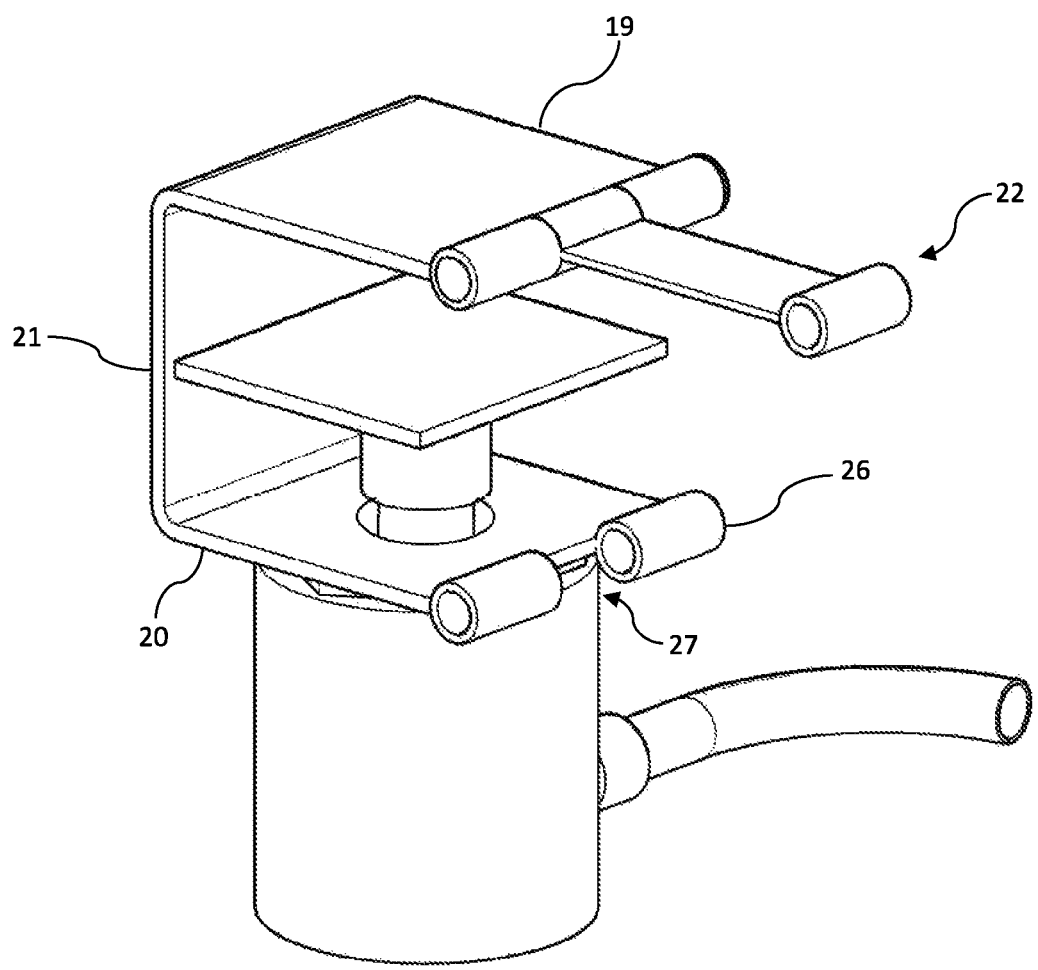
FIG. 5 is a perspective view of the compressive pipe repair apparatus.

As depicted in FIGS. 3 & 4, the compressive pipe repair apparatus of the current application is comprised: of a hydraulic piston cylinder 11, a stationary rectangular steel head 12 attached to the body of the hydraulic piston cylinder 13, and a movable flat plate 14, located inside of the rectangular steel head 12 and connected to the piston shaft 15 of the hydraulic piston cylinder 11.

As depicted in FIG. 3, the hydraulic piston cylinder 11 is comprised of: a cylinder body 13, a connection point to the cylinder body 16, a piston shaft 15 with a connection point 18, and a compressed air connection 17. In the preferred embodiment, the connection points to the cylinder body 16 and the piston 18 are a threaded connections.

The hydraulic piston cylinders 11 utilized by this device are commercially available, and come in a plurality of pressure ratings and stroke lengths. For the purposes of the preferred embodiment the force rating of the hydraulic piston cylinders 11 should be between 1 ton and 10 tons. A force rating below 1 ton may not be able to exert enough force to restore the pipe to its original configuration, and a force rating above 10 tons would be difficult to control and may over-compress the pipe. Additionally, in the preferred embodiment of the invention the stroke of the hydraulic piston cylinders 11 should be between 1 and 4 inches. A stroke below 1 inch would limit the number of sizes of exhaust pipes which the device could be used with, and a stroke above 4 inches would be unnecessarily long, and only increase the cost and weight of the device, making it more challenging to operate.

In addition to a hydraulic piston cylinder 11, the inventor recognizes that a number of mechanical actuator devices which transfer an energy source into a linear motion including electrically actuated cylinders, or linear slides could utilized to perform the same operation as the hydraulic piston cylinder 11. While effective to perform the same operation, the electrically actuated cylinders and linear slides are considerably more expensive and the only advantage they offer is that the devices could be used in the absence of a compressed air source. However, the vast majority of automotive repair shops have compress air sources readily available, so the need for these alternates is unlikely.

As depicted in FIGS. 3 & 4, the rectangular steel head 12 is comprised of: a top 19, a bottom 20, a stationary side 21, and a hinged side 22. The top 19, bottom 20, and stationary side 21 of the rectangular steel head 12 are all fixedly connected to each other by welds.

Located and centered on the underside of the bottom 20 of the rectangular steel head 12 is a connection point 31, which allows the rectangular steel head 12 to connect to the hydraulic cylinder 11. The connection point 31 is designed to be mated with the connection point to the cylinder body 16. In the preferred embodiment the connection point to the cylinder body 16 is a male threaded connection, therefore connection point 31 for the rectangular steel head 12 would be a female threaded connector. In the preferred embodiment the connection point 31 for the rectangular steel head 12 comprises a nut, which is welded to the bottom 20 of the rectangular steel head 12.

Travelling though the center of the center of the bottom plate 20 and the connection point 31 is the piston hole 31. The piston hole 31 is slightly larger than the hydraulic cylinder piston shaft 15 so that the piston shaft 15 can travel upward and downward through the piston hole 31.

As depicted in FIGS. 3 & 4 the movable flat plate 14 is comprised of: a pressure plate 33 and a connection point 34. The pressure plate 33 and connection point 34 of the movable flat plate 14 are fixedly connected to each other by welds.

The pressure plate 33 is rectangular in shape, and is slightly smaller than the interior dimensions of the rectangular steel head 12, so that the movable flat plate 14 can move vertically within the confines of the rectangular steel head 12 as the hydraulic cylinder piston shaft 15 is extended and retracted.

Located and centered on the underside of the pressure plate 33 of the movable flat plate 14 is a connection point 34, which allows the movable flat plate 14 to connect to the hydraulic cylinder piston shaft 15. The connection point 34 is designed to be mated with the connection point to the piston 18. In the preferred embodiment the connection point to the piston 18 is a male threaded connection, therefore connection point 34 for the movable flat plate 14 would be a female threaded connector.

In the preferred embodiment, the hinged side 22 of the rectangular steel head 12 has a hinge 23 connected to the top 19 of the rectangular steel head 12, and an interlocking connection 24 connected to the bottom 20 of the rectangular steel head 12. A swing bar 25 is fixedly connected to the hinge 23 at the top of the top 19 of the rectangular steel head 12 and attaches to the bottom 20 of the rectangular steel head 12 via the interlocking connection 24. A hollow cylinder 26 is located on the bottom of the swing bar 25. The interlocking connection 24 is comprised of two hollow cylinders 26 on the bottom 20 of the rectangular steel head 12, with a gap 27 between the cylinders 26. The gap 27 is the a slightly larger width than the swing bar 25 and is located where the swing bar 25 intersects with the interlocking connection 24. When the two hollow cylinders 26 on the bottom 20 of the rectangular steel head 12 are aligned with hollow cylinder 26 on the bottom of the swing bar 25 a pin 28 is Inserted through the hollow portion of the hollow cylinder 26, to keep the swing bar 25 locked in position.

The hinged side 22 of the rectangular steel head 12 provides an access point to allow the exhaust pipe 3 to be inserted inside the rectangular steel head 12. To insert an exhaust pipe 3 into the rectangular steel head 12 the pin 28 is removed from the interlocking connection 24, and the swing bar 25 is swung open and the exhaust pipe 3 can be inserted inside the rectangular steel head 12. Once the exhaust pipe 3 is inserted inside the rectangular steel head 12, the swing bar 25 is swung closed, the pin 28 is re-inserted into the interlocking connection 24. The hinged side 22 of the rectangular steel head 12 is important, as when the device is operated, without the swing bar 25 in place, the pressure from the hydraulic cylinder 11, could bend or break the rectangular steel head 12 instead of repairing the deformed exhaust pipe 9. Having a secured hinged side 22 provides additional support to the rectangular steel head 12 during operation of the device.

While utilized in the preferred embodiment of the invention, the hinged side 22 of the rectangular steel head 12 is not a critical component of the apparatus. As discussed above, additional support for the rectangular steel head 12 is needed to prevent pressure from the hydraulic cylinder 11 from bending or breaking the rectangular steel head 12, however, there are other means to achieve this function without the hinged side 22. One means to achieve this function would be to machine the top 19, bottom 20, and stationary side 21 of the rectangular steel head 12 from a single piece of steel, with thick walls, so that the overall bend strength of the rectangular steel head 12 would be strong enough that the additional support would not be necessary. Additionally, the rectangular steel head 12 could also be constructed from a high strength, low weight allow, such as titanium, to keep the weight down. While these options could work, the overall cost associated with the materials and manufacturing method is not considered efficient for commercial use.

Figure 8:
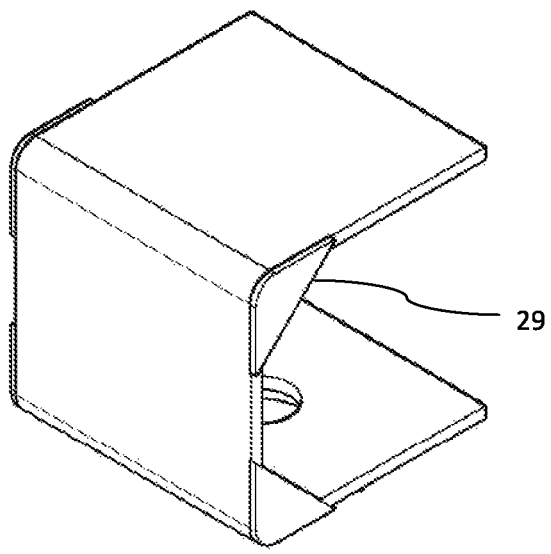
FIG. 8 is a perspective view of the a first alternate embodiment of the compressive pipe repair apparatus rectangular steel head.
Figure 9:
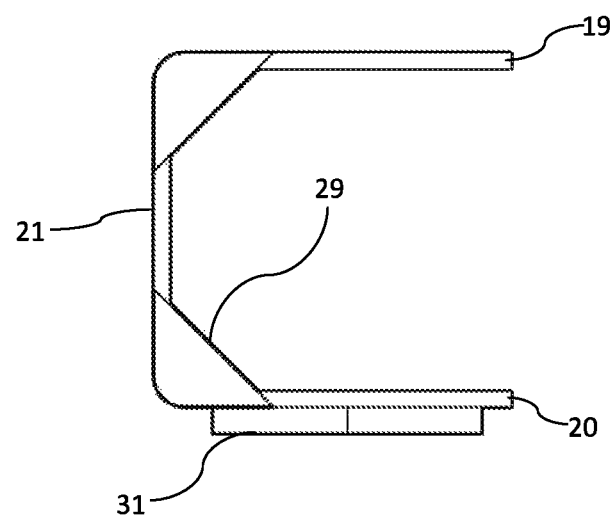
FIG. 9 is a side view of the a first alternate embodiment of the compressive pipe repair apparatus rectangular steel head.

FIGS. 8 and 9 depict a first alternate embodiment of the rectangular steel head 12 where the use of a hinged side 22 for support is replaced by the use of chamfered re-enforcements 29 at the corners where the top 19 and bottom 20 sides are welded to the stationary side 21 of the rectangular steel head 12. The chamfered re-enforcements 29 are right angle triangular shaped and are flush with the corners of the rectangular steel head 12. The chamfered re-enforcements 29 are welded to the rectangular steel head 12, and once in place, will increase the overall bend and break strength of the rectangular steel head 12 so that the additional support of the hinged side 22 would not be necessary.

Figure 10:
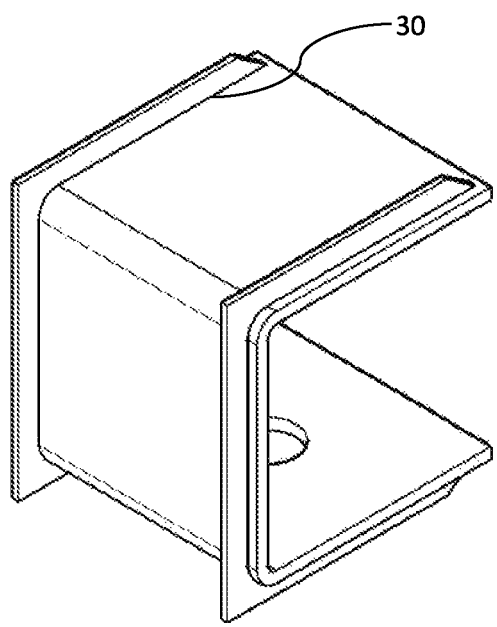
FIG. 10 is a perspective view of a second alternate embodiment of the compressive pipe repair apparatus rectangular steel head.
Figure 11:
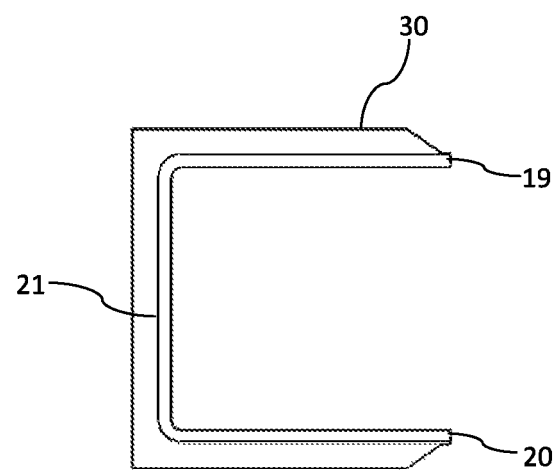
FIG. 11 is a side view of a second alternate embodiment of the compressive pipe repair apparatus.

FIGS. 10 and 11 depict a second alternate embodiment of the rectangular steel head 12 where the use of a hinged side 22 for support is replaced by the use of a plurality of steel ribs structures 30 that run along the outside surfaces of the at top 19, bottom 20 and stationary sides 21 of the rectangular steel head 12. FIGS. 10 and 11 depict the use of two rib structures 30, however, more steel rib structures 30 could be utilities if necessary. The chamfered steel rib structures 30 are welded to the rectangular steel head 12 and once in place, will increase the overall bend and break strength of the rectangular steel head 12 so that the additional support of the hinged side 22 would not be necessary.

Figure 6:
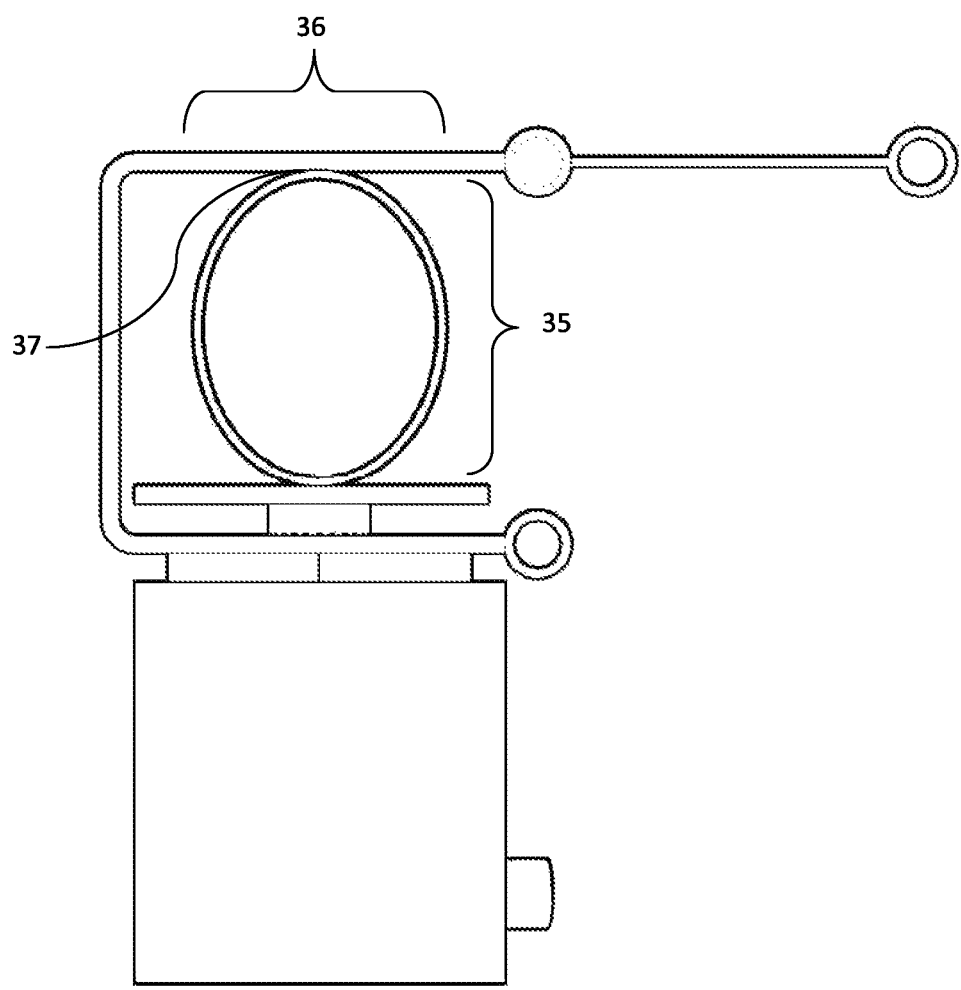
FIG. 6 is a sectional front view of the compressive pipe repair apparatus depicting how to orient the deformed pipe in the compressive pipe repair apparatus.

As depicted in FIG. 6, the repair method of the preferred embodiment of the current invention involves opening the hinged side 22 of the rectangular steel head 12 and placing the deformed section of pipe 9 within the rectangular steel head 12 of the compressive pipe repair apparatus when the cylinder piston shaft 15 and movable flat plate 14 are retracted. Once the deformed section of pipe 9 is within the rectangular steel head 12 hinged side 22 is closed, and the pin 28 is inserted to hold the hinged side 22 of the rectangular steel head 12 in place.

The deformed pipe 9 will have an elliptical shape with an axis that is longer than the original Nominal Outer Diameter (OD) of the pipe, known as the Max OD and an axis that is shorter than the Nominal OD of the pipe, known as the Min OD. The Max OD has two vertex points 35 which are the points on the Max OD axis where the ellipse makes its sharpest turn, and the Min OD also has a two vertex points 36 which are the point on the Min OD axis where the ellipse makes its sharpest turn. The compressive pipe repair apparatus is oriented with the deformed section of pipe 9 so that the two vertices of the Max OD 35 of the deformed section 9 of pipe are aligned with the center of the top 19 of the rectangular steel head 12 and the center of the movable flat plate 14.

Figure 7:
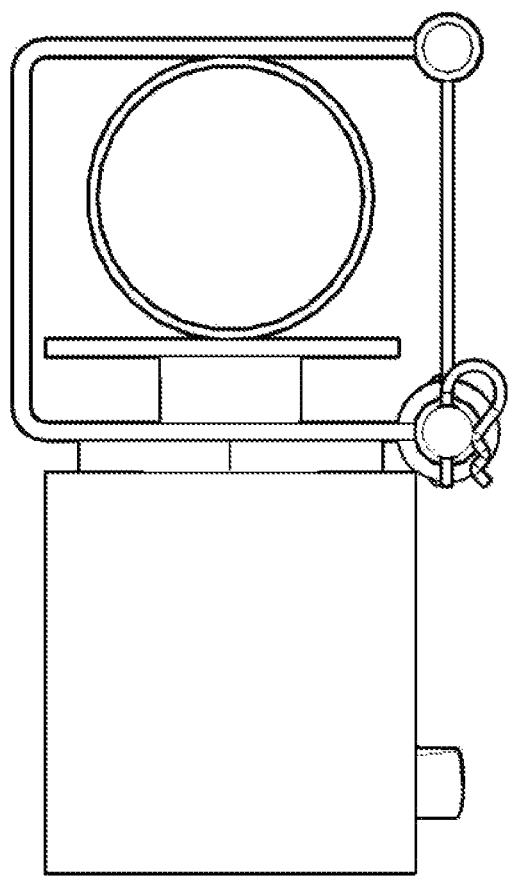
FIG. 7 is a sectional front view of the compressive pipe repair apparatus a completed repair of a deformed pipe in the compressive pipe repair apparatus.

As depicted in FIG. 7, once the deformed section of pipe 9 is oriented within the rectangular steel head 12 of the compressive pipe repair apparatus, the hydraulic piston cylinder 11 is activated by the mechanic by providing compressed air to the compressed air connection 17 and the cylinder piston shaft 15 and movable flat plate 14 will extend upward and sandwich the top and bottom vertices of of the Max OD axis 35 between the movable flat plate 14 and the top 19 of the rectangular steel head 12. The mechanic will continue to operate the hydraulic cylinder 11 and the piston shaft 15 will continue to extend, exerting compressive stresses against the deformed section of exhaust pipe 9. The mechanic will continue to operate the hydraulic cylinder 11 until the Max OD axis of the pipe has been reformed to match the original Nominal OD of the pipe. By compressing the Max OD axis of the deformed exhaust pipe 9 to match the Nominal OD, the Min OD of the pipe will extend to match the Nominal OD of the pipe as well, restoring the exhaust pipe to its original circular profile shape prior to the collision.

As the hydraulic cylinder 11 exerts pressure on the deformed section of exhaust pipe 9, compressing the Max OD axis of the deformed exhaust pipe 9 to match the Nominal OD, the bent section of the pipe will also re-align itself with its original configuration on the underside of the automobile 1, so that the exhaust pipe 3 can be re-attached to the broken pipe hanger(s) 10. During the repair method, the mechanic should operate the hydraulic cylinder 11 until both the deformed exhaust pipe 9 pipe has been restored to its original Nominal OD and the exhaust pipe 3 has been re-aligned with the broken pipe hangers 10. Once this is complete, the machine can connect the pipe hanger 7 and the exhaust pipes 3, and the repair is complete.

It would be appreciated by those skilled in the art that various changes and modifications can be made to the illustrated embodiments without departing from the spirit of the present invention. All such modifications and changes are intended to be covered by the claims.

What is claimed is:

1. A method of restoring a deformed exhaust pipe section of an automobile to its original profile shape and alignment with pipe hangers, wherein said deformed exhaust pipe section has been bent away from a pipe hanger and deformed from a circular shape profile into an elliptical shape profile with two maximum axis vertices, said restoration method comprising:

providing a mechanical actuation device that transfers an energy source into a linear motion between 1 and 4 inches capable of exerting between 1 and 10 tons of force, said mechanical actuation device comprising a fixed body, and a linear motion shaft that retracts and extends;

providing a head unit with a top, a bottom, and a side, the bottom connected to the mechanical actuation device, the head unit further comprising a linear motion shaft opening in the bottom of the head unit which allows the linear motion shaft to travel upward though the bottom of the head unit when the energy source is provided to the mechanical actuation device and a reinforcement structure which increases the bend strength of the head unit, wherein the reinforcement structure comprises a hinge affixed to either the top or bottom of the head unit, a hinged side attached to the hinge and an interlocking connection located on the top or bottom of the head unit, whereby when the hinged side is interlocked with the interlocking connection the head unit will further comprise a fourth side;

when the linear motion shaft is retracted, orienting the deformed exhaust pipe within the head unit so that the maximum axis vertices are oriented towards the top and bottom of the head unit;

extending the linear motion shaft from the mechanical actuation device until the one of the maximum axis vertices contacts the linear motion shaft and the other maximum axis vertices contacts the top of the head unit;

continuing to extend the linear motion shaft from the mechanical actuation device, exerting compressive forces on the deformed exhaust pipe until the deformed exhaust pipe has been reformed to a circular shape profile and the exhaust pipe has been re-aligned with the pipe hanger.

* * * * *